(12) United States Patent
Woody et al.

(10) Patent No.: US 9,336,286 B2
(45) Date of Patent: May 10, 2016

(54) GRAPHICAL RECORD MATCHING PROCESS REPLAY FOR A DATA QUALITY USER INTERFACE

(71) Applicants: Jeffrey Woody, Onalaska, WI (US); Ronald Dupey, West Salem, WI (US); Prasanthi Thatavarthy, Onalaska, WI (US)

(72) Inventors: Jeffrey Woody, Onalaska, WI (US); Ronald Dupey, West Salem, WI (US); Prasanthi Thatavarthy, Onalaska, WI (US)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 14/150,203

(22) Filed: Jan. 8, 2014

(65) Prior Publication Data
US 2015/0193511 A1    Jul. 9, 2015

(51) Int. Cl.
*G06F 17/30* (2006.01)
(52) U.S. Cl.
CPC ................................ *G06F 17/30554* (2013.01)

(58) Field of Classification Search
USPC ........... 707/722, 781, 783, 784, 785; 348/564
See application file for complete search history.

(56) References Cited

U.S. PATENT DOCUMENTS

2008/0062318 A1 * 3/2008 Ellis .................... H04N 5/44543
348/564

* cited by examiner

*Primary Examiner* — Hung T Vy
(74) *Attorney, Agent, or Firm* — Buckley, Maschoff & Talwalkar LLC

(57) ABSTRACT

According to some embodiments, a plurality of records may be received, and a data quality platform may execute a matching process to match at least some records with each other. A replay request associated with at least two of the received records may be received from a user, and information about the at least two records and a first decision in the matching process may be graphically displayed via a user interface. A result of the first decision in the matching process may then be graphically displayed to the user. Similarly, information about the at least two records and a second decision in the matching process, subsequent to the first decision, may be graphically displayed in the user interface. A result of the second decision in the matching process may then be graphically displayed to the user.

21 Claims, 20 Drawing Sheets

| GROUP ID 1902 | RECORD ID (PERSON) 1904 | COUNTRY 1906 | STREET 1908 |
|---|---|---|---|
| G_101 | R_42373 (JOE Q. SMITH) | USA | 1234 NORTH BOULEVARD |
| G_101 | R_93691 (JOE SMITH) | USA | 1234 NORTH BOULEVARD |
| G_101 | R_19801 (JOSEPH SMITH) | USA | 1234 NORTH BOULEVARD |
| G_102 | R_76393 (TONY STARK) | USA | 1201 AVENUE OF THE AMERICAS |
| G_102 | R_58236 (ANTHONY EDWARD STARK) | USA | 1201 AVENUE OF THE AMERICAS |

GRAPHICAL RECORD MATCHING PROCESS REPLAY FOR A DATA QUALITY USER INTERFACE

FIELD

Some embodiments relate to a data quality user interface. More specifically, some embodiments provide a graphical record matching process replay for a data quality user interface.

BACKGROUND

A business or enterprise may store information about various items in the form of electronic records. For example, a company might have an employee database where each row in the database represents a record containing information about a particular employee (e.g., the employee's name, date of hire, and salary). Moreover, different electronic records may actually be related to a single item. For example, a human resources database and a sales representative database might both contain records about the same employee. In some cases, it may be desirable to consolidate multiple records to create a single data store that contains a single electronic record for each item represented in the database. Such a goal might be associated with, for example, an automated a data quality process application and/or a data steward that attempt to automatically recognize or match these records to create a correct "master" data store. Advantages associated with creating such a master data store might include increased efficiency through the enterprise and/or improved customer service. For example, when a sales representative retrieves a customer record, the master data store might include contact information that would have been missing if information from multiple records were not correctly matched and merged.

The matching and consolidation process in a data quality program can be a relatively time consuming and/or expensive task, especially when a substantial number of records (e.g., millions of records) and/or input data sources are involved. It can be difficult, moreover, to determine why certain records are automatically matched while others are not. For example, a data steward might be unsure why two very similar records were not automatically identified as a potential match.

Accordingly, methods and mechanisms for accurately and efficiently providing an understanding of how a data quality program operates may be desired.

BRIEF DESCRIPTION OF THE DRAWINGS

FIG. 19 is an example of a tabular portion of a replay database according to some embodiments.

DETAILED DESCRIPTION

Figure 1:
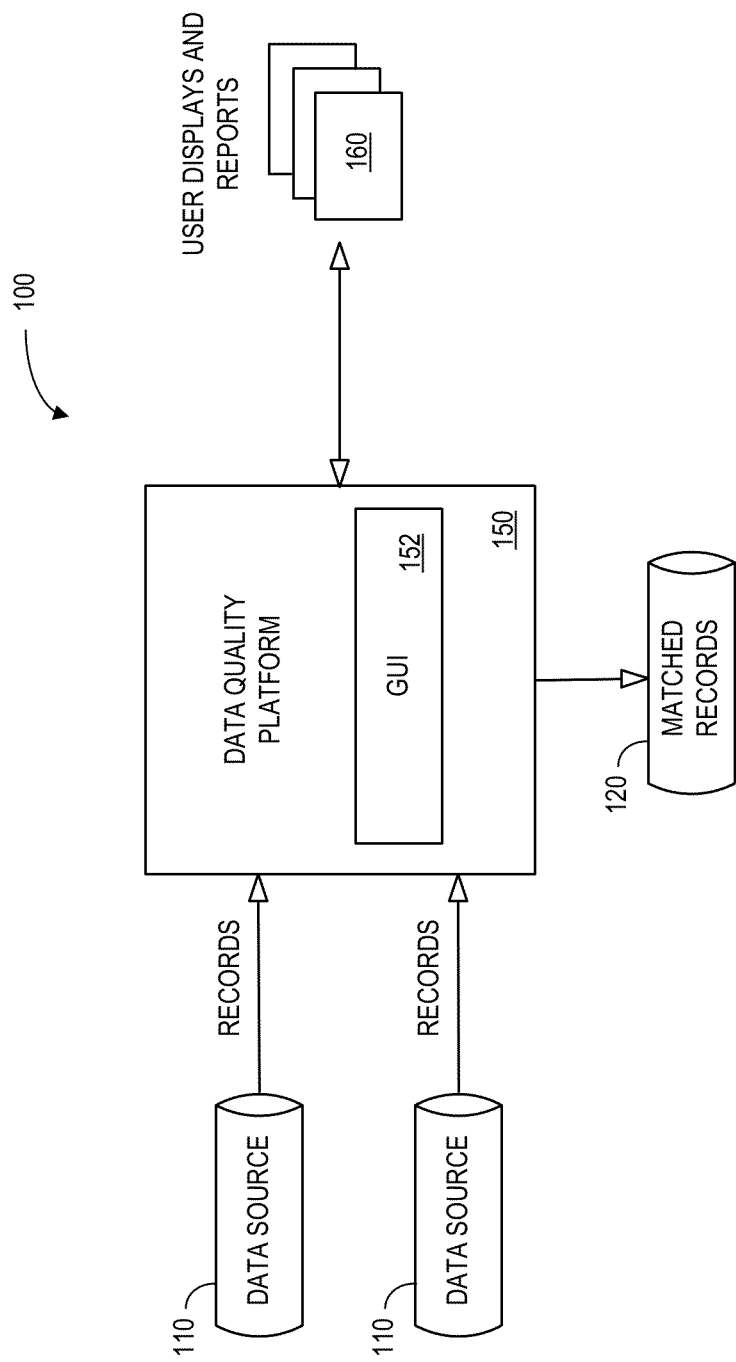
FIG. 1 is a block diagram of a system that might be associated with a data quality process or program according to some embodiments.

FIG. 1 is a block diagram of a system 100 that might be associated with a data quality process. The system 100 includes one or more data sources 110 storing records. Note that each record might contain a number of fields (e.g., a key number, business partner name, license number, and/or postal address). Different data sources 110 may, for example, be associated with different business applications, including legacy applications. According to some embodiments, one or more data sources 110 might be associated with an Enterprise Resource Planning ("ERP") system. Note that the records might be stored within physical tables of a database. The database might comprise a relational database such as SAP MaxDB, Oracle, Microsoft SQL Server, IBM DB2, Teradata and the like. As another example, the data sources 110 might be associated with a multi-dimensional database, an eXtendable Markup Language ("XML") document, or any other structured data storage system. The physical tables may be distributed among several relational databases, dimensional databases, and/or other data sources.

A data quality platform 150 may receive input records from the various data sources 110. For example, the data quality platform 150 might import the input records from a remote data source 110 via HyperText Transport Protocol ("HTTP") communication or any other type of data exchange. The data quality platform 150 and/or data sources 110 might be associated with, for example, Personal Computers ("PCs"), servers, and/or mobile devices.

The data quality platform 150 may consolidate and/or merge the input records received from the data sources 110 and store master records into a matched records database 120 in accordance with any of the embodiments described herein. For example, a human resources database and a sales representative database might both contain records about the same employee. In this case, the data quality platform 150 might automatically consolidate the multiple records to create a single master record for that employee (and the master record might include information from both systems). Such a goal might be associated with, for example, a data quality process program.

According to some embodiments, a consolidation of records in a data quality process may be associated with identifying potential duplicates and/or merging the records into a single best representative instance of the record. Note that large sets of data might be extracted from multiple legacy systems into the data quality platform 150 and include some obvious, straight forward duplicates that need to (and can be) resolved and merged immediately after the data is imported into the data quality platform 150. In many cases, the duplicate detection will be straight forward, such as when it is based on a well defined identifier that can't be interpreted in ambiguous ways. Examples of such identifiers include a Social Security Number for to identify individuals or a Global Trade Item Number ("GTIN") to detect duplicate materials.

In some cases, however, it may be difficult to automatically identify two records as a match. For example, incomplete information and small differences in names, addresses, etc. can make it difficult to automatically detect appropriate matches. Moreover, duplicate records may need to be merged into a single physical record, but conflicting data values exist among the different records. For example, one record might indicate a home address of "123 Main Street" while another record indicates a home address of "12 Main Street." A rule based mechanism may facilitate matching and consolidation in various situations and this logic may comprise a set of rules that automate and streamline the data quality process. After the records are matched and merged, an administrator or data steward may interact with a Graphical User Interface 152 to adjust logic, create displays, and/or generate reports in accordance with any of the embodiments described herein.

The rules and conditions associated with a data quality record matching configuration are complex to understand. For example, a data steward might run some tests with a pre-configured data quality configuration on 3 million records and evaluate the results. The data steward may have expected around 50% matches on the data but only see 25% matches in the results. He or she might not know what to check in the configuration, so the data steward may send the results to a match expert. The match expert may attempt to find the missing matches by performing various SELECT's and ORDER BY's on the test records. Then, the user might manually browse through thousands of records trying to find any missing matches. When any missing matches are found, the expert may try to determine why the records weren't identified with the original configuration, modifying the configuration, re-run the matching process, and then re-analyzing the results. This is a very time consuming and manual workflow. According to some embodiments, the system of FIG. 1 will allow the data steward to view and/or adjust a graphical play-by-play illustrating of the matching process (perhaps avoiding the need to consult a match expert at all).

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
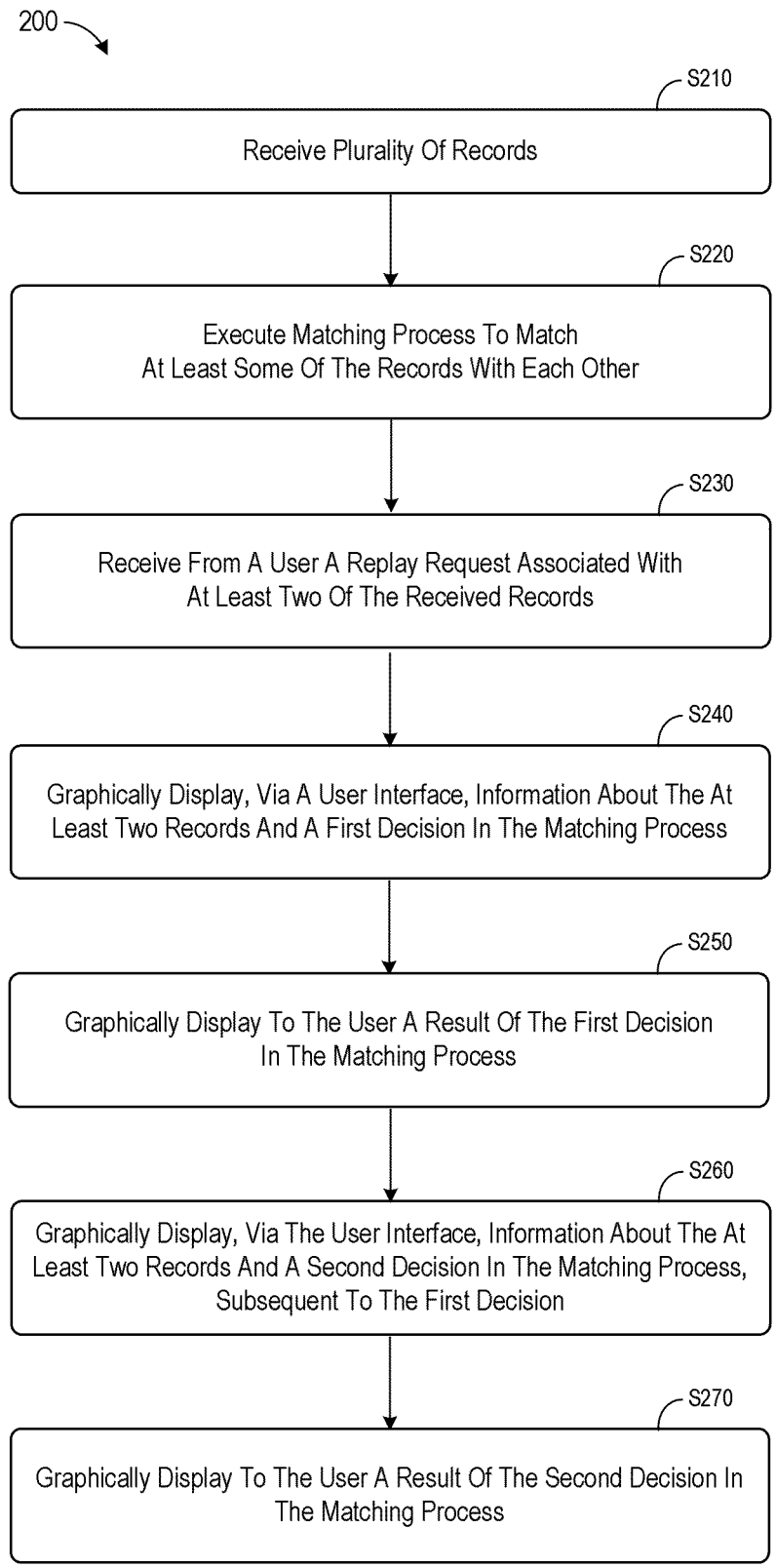
FIG. 2 is a flow diagram of a process in accordance with some embodiments.

The data quality platform 150 may operate in accordance with any of the embodiments described herein. For example, FIG. 2 is a flow diagram of a process 200 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a plurality of input records may be received, such as by receiving a batch of records from one or more. For example, a batch of records might be received from an enterprise resource planning system or a customer relationship management system on a periodic basis. At S220, a data quality process may be performed on the received records to match at least some records with each other. For example, fields within each record might be used to determine that two slightly different records actually refer to the same "real word" person (e.g., employee or customer).

At S230, a "replay request" associated with at least two of the received records may be received from a user. For example, the user might select the two records on a GUI and active a "replay" or "play-by-play" icon on the display to better understand why those two records were matched (or not matched) by the data quality process.

At S240, information about the at least two records and a first decision in the matching process may be graphically displayed via a user interface, and a result of the first decision in the matching process may be graphically displayed to the user at S250. According to some embodiments, the user interface includes a graphical representation indicating why records are matching and/or why records are not matching. Moreover, the user interface may include a graphical representation indicating which match rules are currently being used and/or which match rules have the most effect. The interface may further indicate information about record filters, candidate keys, comparison pair filters, and/or match criteria.

Similarly, at S260, information about the at least two records and a second decision in the matching process, subsequent to the first decision, may be graphically displayed via the user interface, and a result of the second decision in the matching process may be graphically displayed to the user at S270. In this way, the interface may help the user understand the operation and results of a matching process in a step-by-step fashion. According to some embodiments, an adjustment to the matching process may be received from the user (e.g., via the interface). In this case, the adjusted matching process may be executed, and a result of the adjusted matching process can be displayed to the user. Moreover, in accordance with some embodiments, a comparison between the original matching process and the adjusted matching process may be displayed to the user (e.g., whether more records were identified as matches, an impact on processing time, etc.).

Figure 3:
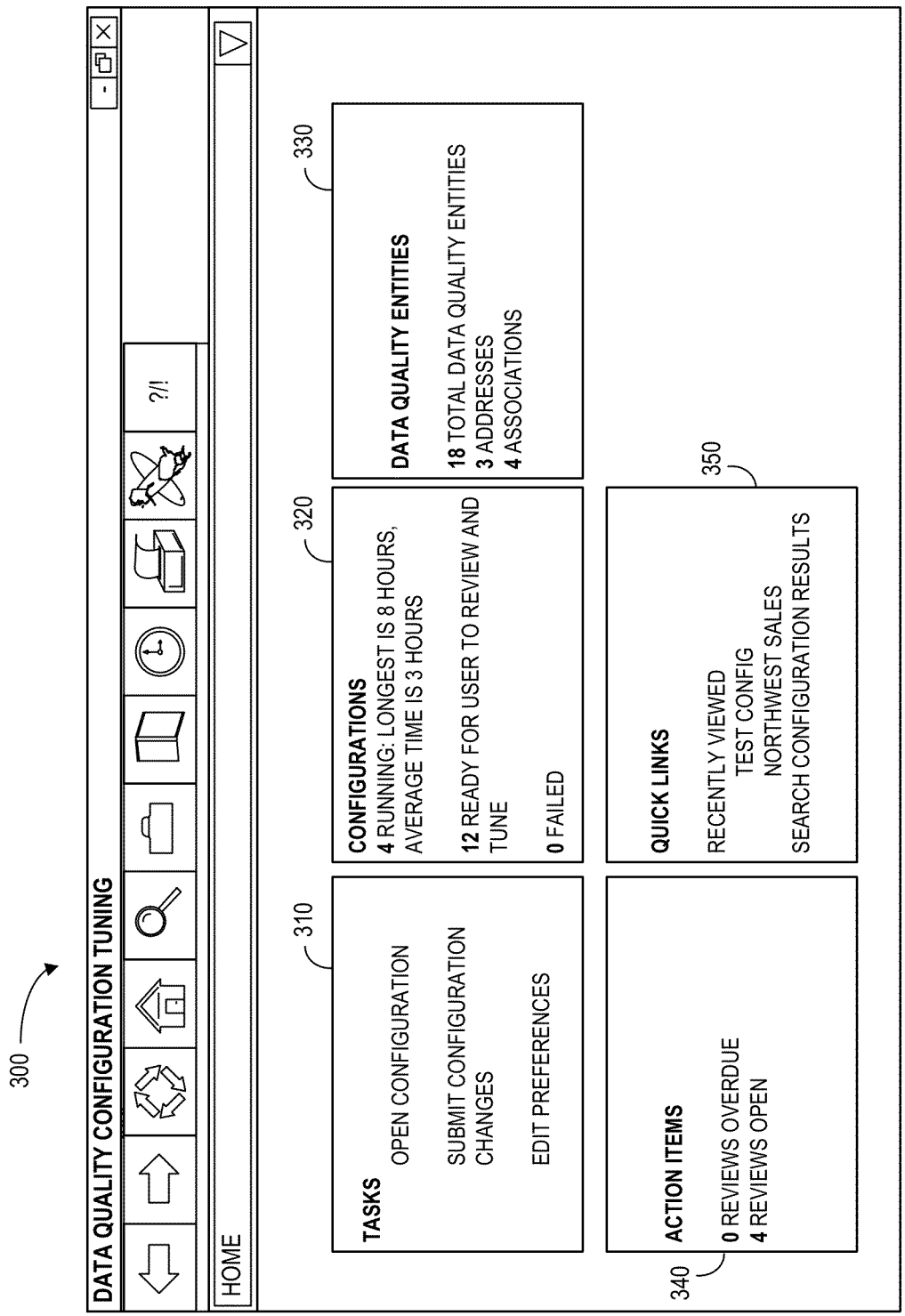
FIG. 3 illustrates a home display that may be provided according to some embodiments.

Some user in interface displays will now be described as an exemplary embodiment, but it will be understood that other types of displays may be provide in accordance with any of the embodiments described herein. FIG. 3 illustrates a home display 300 for a data quality process according to some embodiments. The home display 300 may include a tasks area 310 to let a user open match "configurations," submit configurations, and/or edit data quality process preferences. As used herein, the term "configurations" might refer to, for example, a set of matching logic, rules, conditions, etc. The home display may also include a configurations area 320 to provide information about configuration runs (e.g., longest or average run times), configurations ready for user review and/or tuning, and any failed configuration. The home display may further include a data quality entities area 330 providing numbers of data quality entities (e.g., data stewards and/or architects), addresses, and/or associations. According to some embodiments, the home display 300 include an action items area 340 (displaying information about overdue and/or open data quality action items) and a quick links area 350 selectable by a user to access other portions of the user interface.

Figure 4:
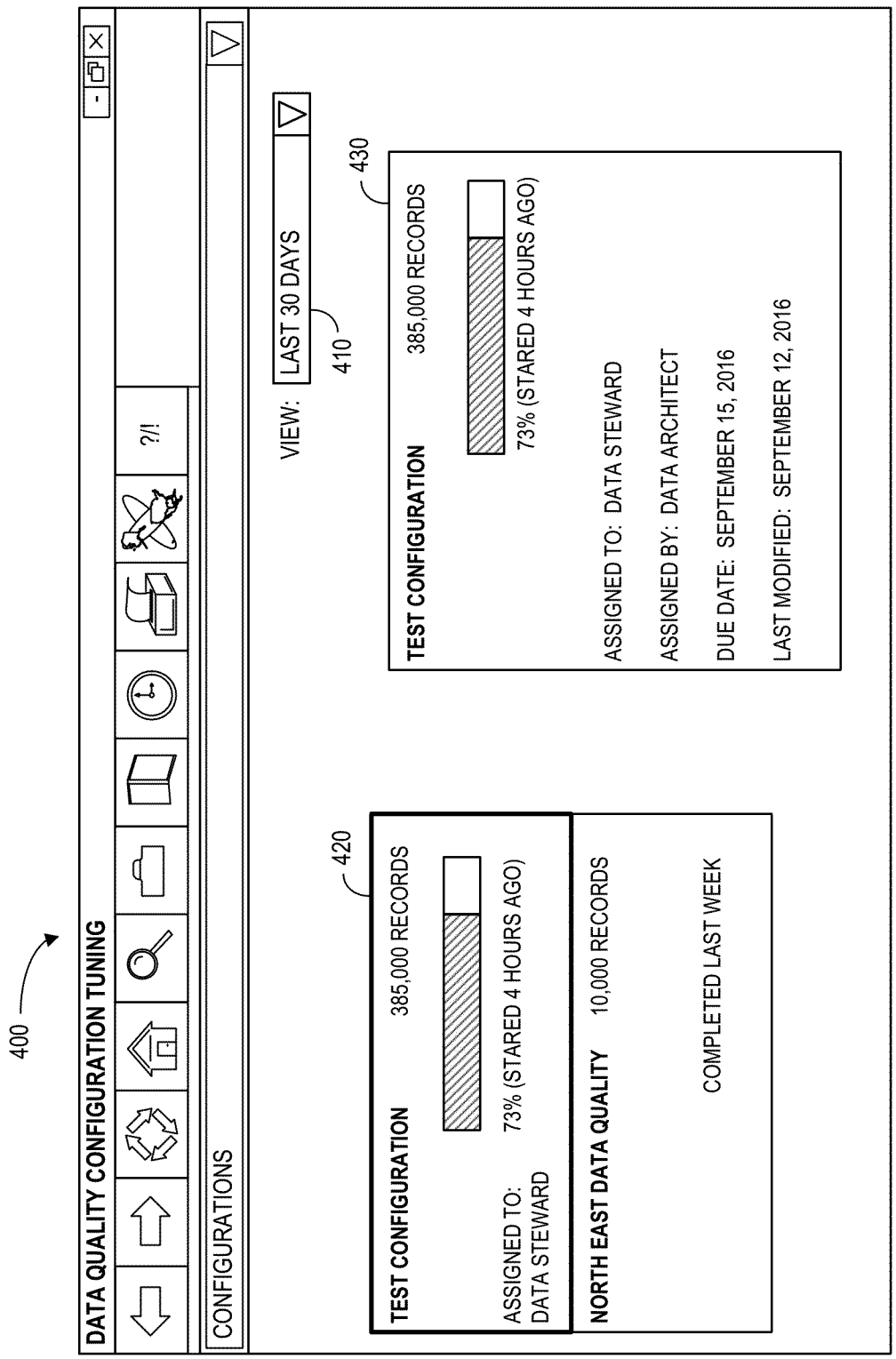
FIG. 4 illustrates a configurations display that may be provided according to some embodiments.

According to some embodiments, selections of various areas on the come display 300 will take the user to another page. For example, selection of the configurations area may result in display of a configuration display 400 such as the one illustrated in FIG. 4. The configurations display 400 may include a selectable filter 410 allowing a user to determine which potential configurations 420 will be provided on the display 400. Moreover, selection of one of the potential configuration 420 may result in a selected configuration 430 being provided with further details about that configuration (e.g., when the configuration was last run, current progress, duration, etc.)

Figure 5:
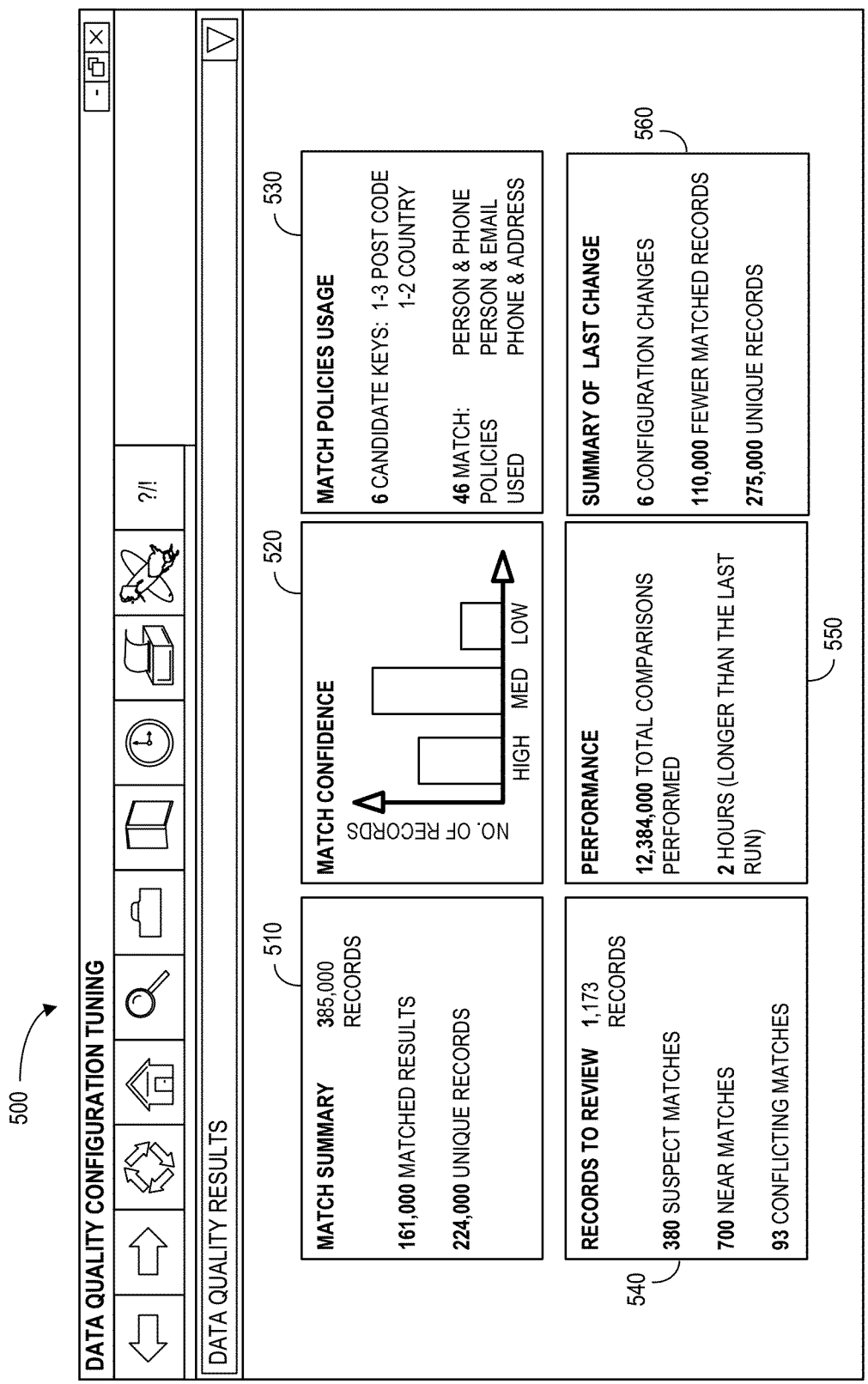
FIG. 5 illustrates a data quality results display that may be provided in accordance with some embodiments.

FIG. 5 illustrates a data quality results display 500 that may be provided in accordance with some embodiments. The results display 500 may include a match summary area 510 indicating how may records were automatically matched with other records by the data quality process and/or how many unique records remained after the matching process. The results display 500 may further include a match confidence area 520 indicating, for example, how many matches are associated with a high, medium, or low level of confidence (that is, that the match records do in fact refer to the same thing). According to some embodiments, the results display 500 includes a match policies usage area 530 indicating which candidate keys and/or match policies have been used. In addition, the results display 500 might include a records to review area 540 (e.g., indicating suspect matches, near matches, and/or conflicting matches that may need to be reviewed), a performance area 550 (e.g., displaying a total number of comparisons and a run time associated with the data quality process), and a summary of last change area 560 (e.g., indicating if the last change improved the matching process). The data quality results display 500 may improve a user's workflow in several ways. Instead of looking at a match output table with dozens of output fields, and trying to learn the meaning of these match output fields and comparing them across one or more runs (remembering what was changed in each), the user may simply see a summary of such information on the data quality results display 500.

Figure 6:
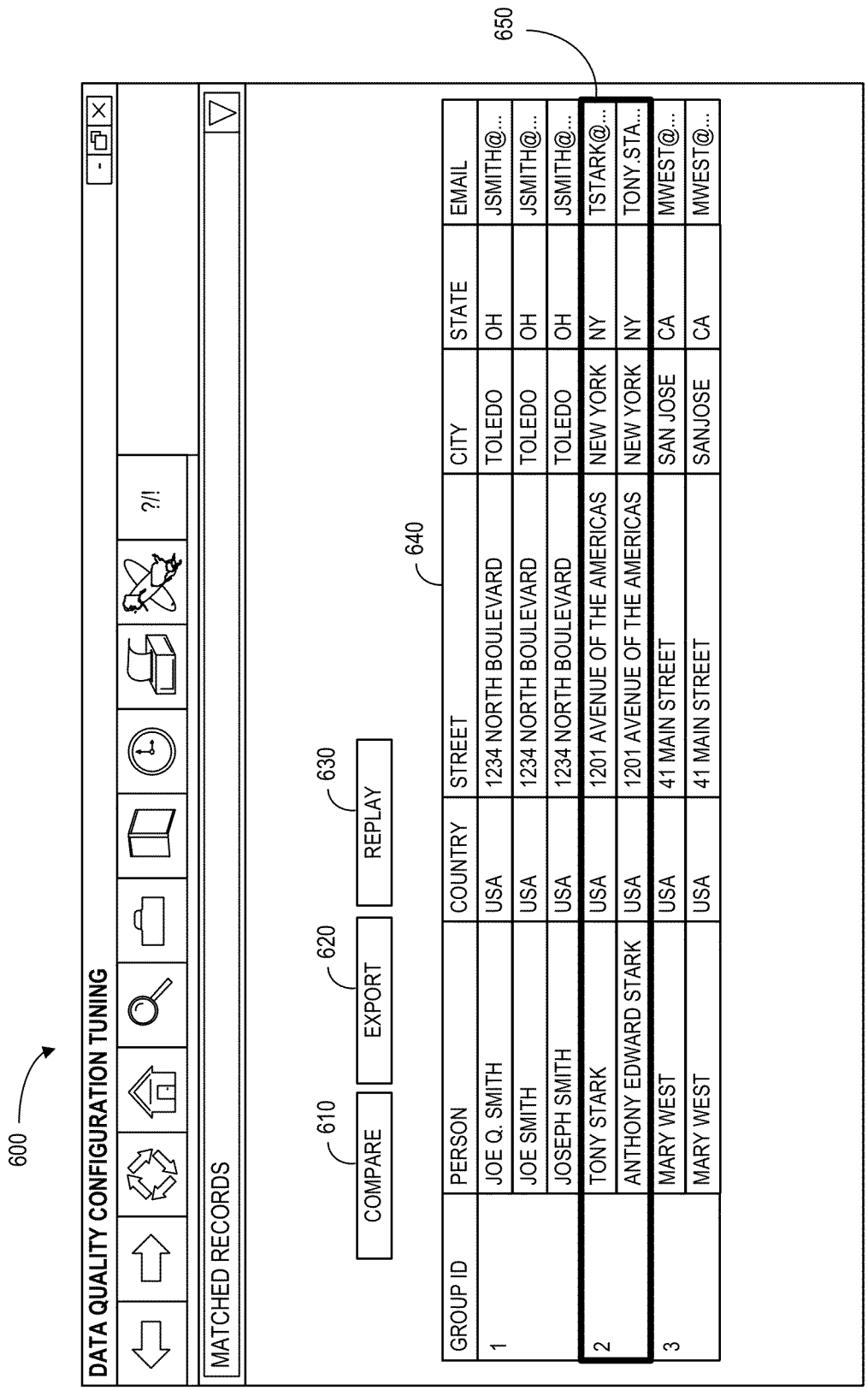
FIG. 6 illustrates a matched records display that may be provided according to some embodiments.

FIG. 6 illustrates a matched records display 600 that may be provided according to some embodiments. The display may include a compare icon 610 (selectable to initiate a configuration run) and an export icon 620 (selectable to output the match results. A record table 640 may display matched records, including the field values for each of the records. A user may see records in the table 640 that he or she thinks should match (or records that should not match), but have no idea how to change the match configuration to get the desired result. A typical workflow is to look at match output fields of the records in the table 640 sorting by match group number and other fields to see matches grouped together or trying various SQL statements to sort records and try to find missed matches. Users then look at match output fields in the table 640 and try to guess what options in the match configuration should be made looser or tighter. Users then re-run and manually compare the results to a saved copy of previous results to try and determine whether or not the change had the desired effect.

Figure 7:
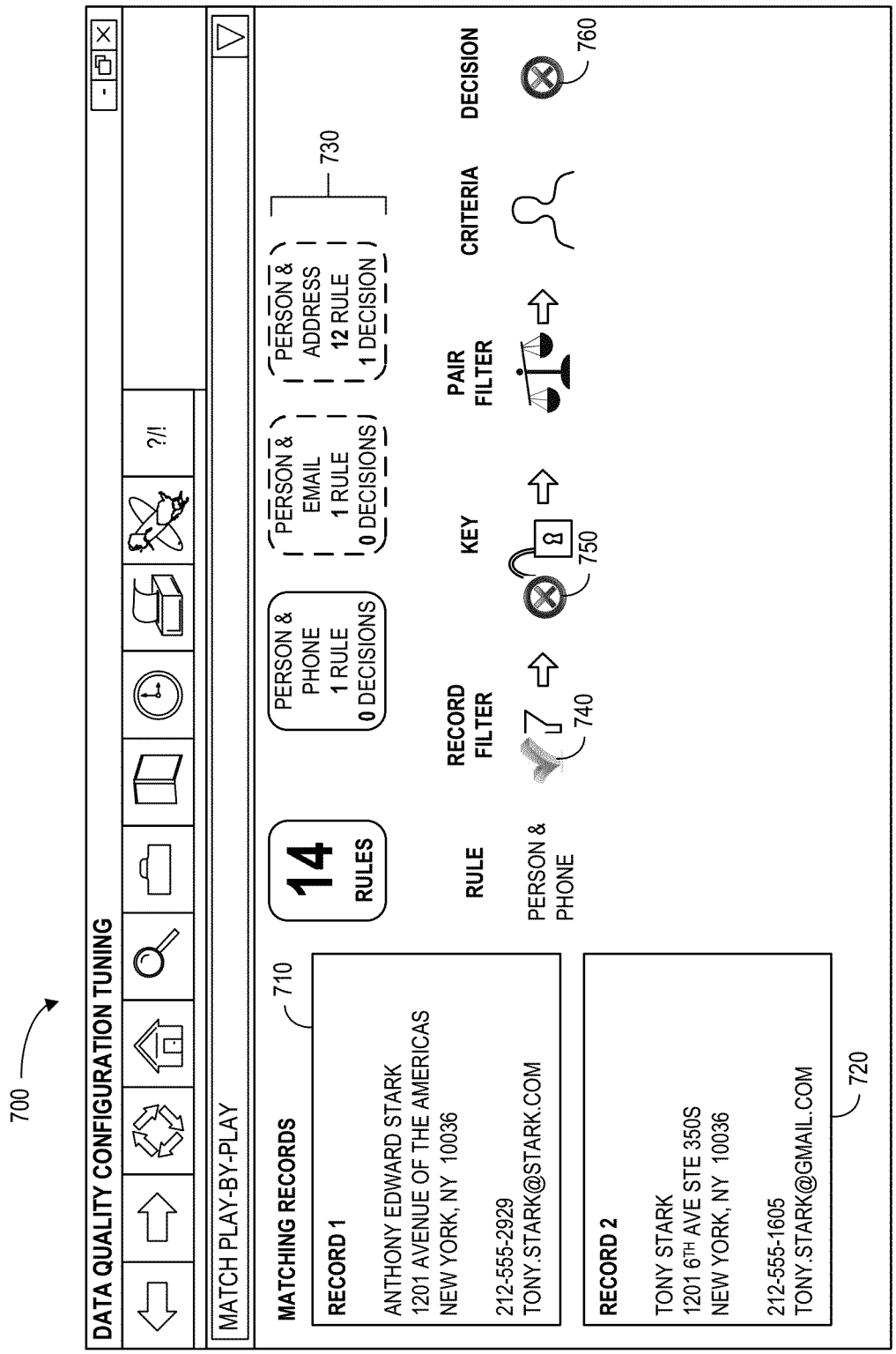
FIGS. 7 through 16 illustrate match play-by-play displays that may be provided in accordance with some embodiments.

To improve this process, according to some embodiments described herein the user may designate a selected pair of records 650 and activate an replay icon 630 to initiate a play-by-play presentation to help him or her figure out why the selected pair of records 650 did or did not result in match. In the example of FIG. 6, the user has selected the "Tony Stark" and "Anthony Edward Stark" records. Selection of the replay icon 630 may result in a match play-by-play display 700 being provided as illustrated in FIG. 7. In particular, the match play-by-play display 700 includes a first record details area 710 and a second record details area 720 providing detailed information about the selected pair of records 650.

Note that the information in the records details area 710, 720 may represent the originally received field values or may have been adjusted by a data quality platform (e.g., using a dictionary of nicknames, a postal address database, etc.).

A rule area 730 provides information about the matching rule sets used in the data quality process. In the example of FIG. 7, the rule area 730 displays data about three matching rule sets: "Person & Phone," "Person & Email," and "Person & Address." Moreover, selection of "Person & Phone" rule set by the user (as indicated by the solid line in FIG. 7), results a graphical representation of the rules associated with that set (a single rule in the example of FIG. 7). In particular, the record filter stage associated with the rule is followed by the candidate selection key stage, followed by the comparison pair filter stage, followed by the criteria stage, and finally the overall rule decision. For each stage of the rule, a "check" icon 740 might indicate success while an "x" icon 750 might indicate failure. Moreover, an overall decision icon 750 (e.g., the result of application of the rule to the two records 710, 710) may be graphically provided on the play-by-pay display 700. In the example of FIG. 7, the record filter step was successful for the records 710, 720, but the characteristic key step failed, resulting in an overall decision of fail 750 for that rule.

Figure 8:
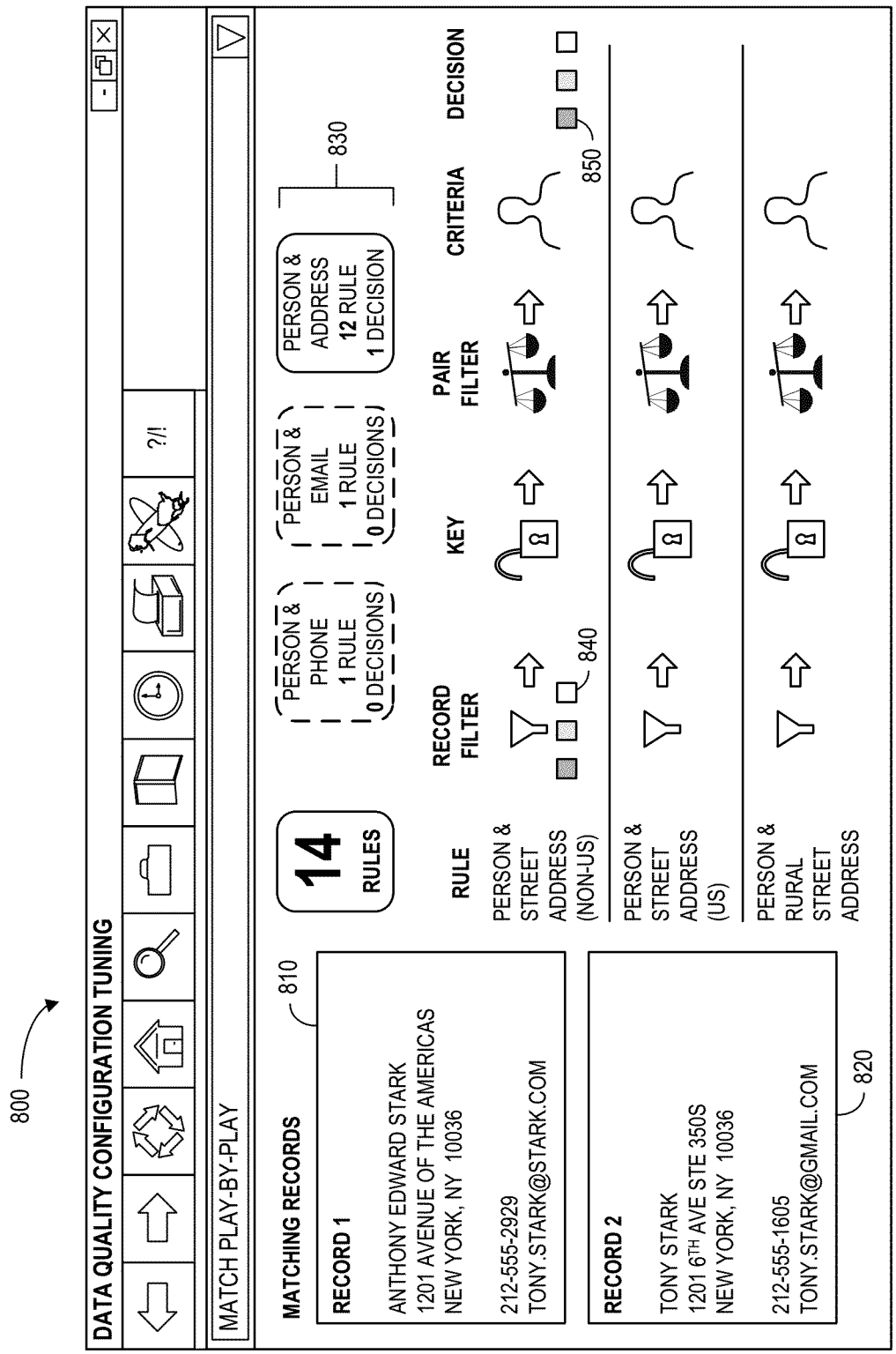

Note that a rule set might be associated with more than one rule. For example, selection of the "Person & Address" rule set in the rule area 730 may result in display of a play-by-play display 800 such as the one shown in FIG. 8. As before, a first record details area 810 and a second record details area 820 provide detailed information about the selected pair of records. A rule area 830 indicates that "Person & Address" rule set has been selected by the user (as indicated by the solid line in FIG. 8), which results a graphical representation of the 12 rules associated with that set (e.g., three are included in FIG. 8 but a user might be able to scroll up or down to see additional rules in the set). For each rule, the record filter stage associated with the rule is followed by the candidate selection key stage, followed by the comparison pair filter stage, followed by the criteria stage, and finally the overall rule decision is displayed. The display 800 may then provide to the user an execution of each rule in a step-by-step fashion. In the example of FIG. 8, the display 800 graphically indicates that the record filter step of the "Person & Street (Non-US)" rule is in process 840 (and that the overall result or decision is also in process 850).

Figure 9:
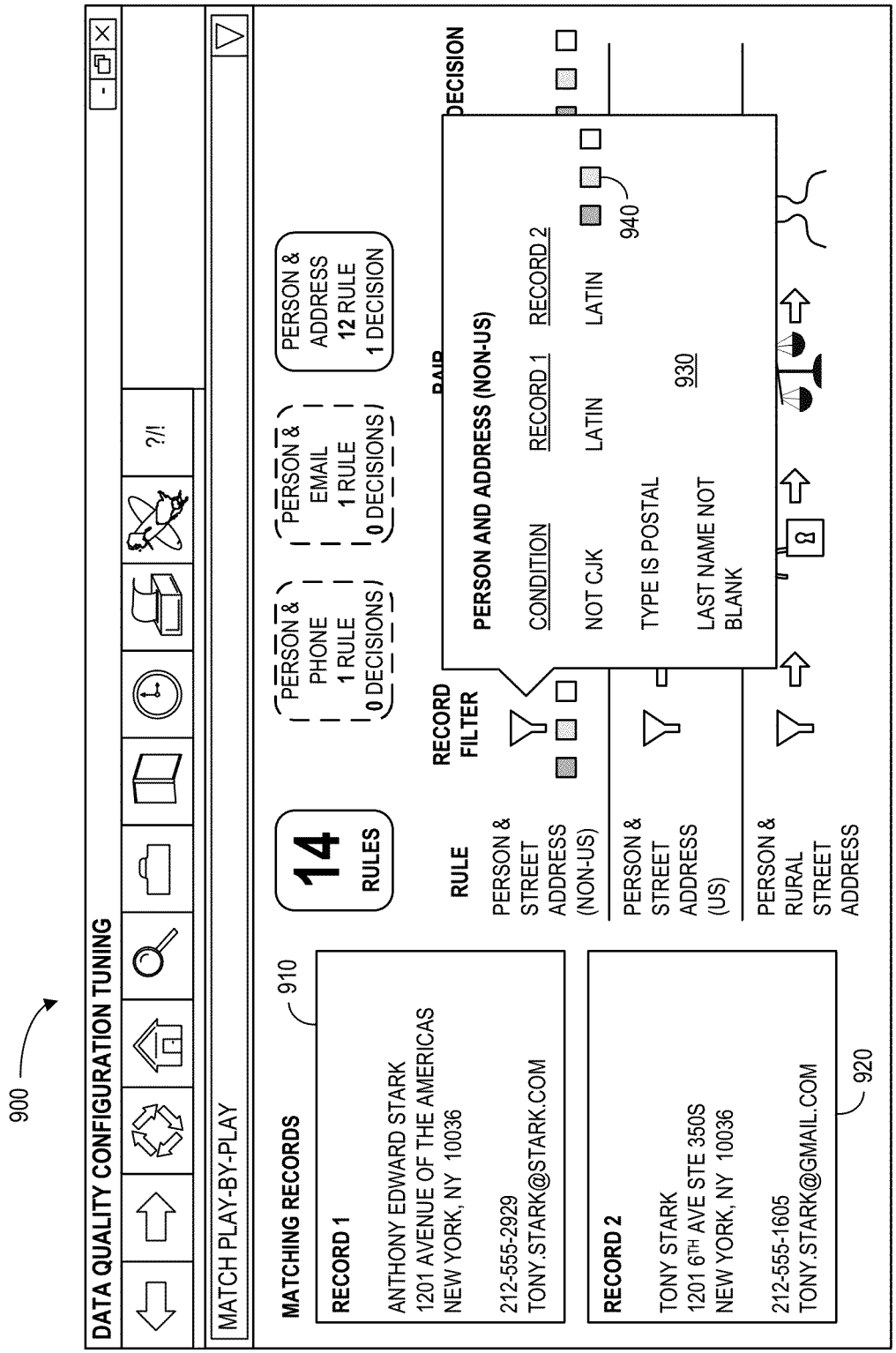
Figure 10:
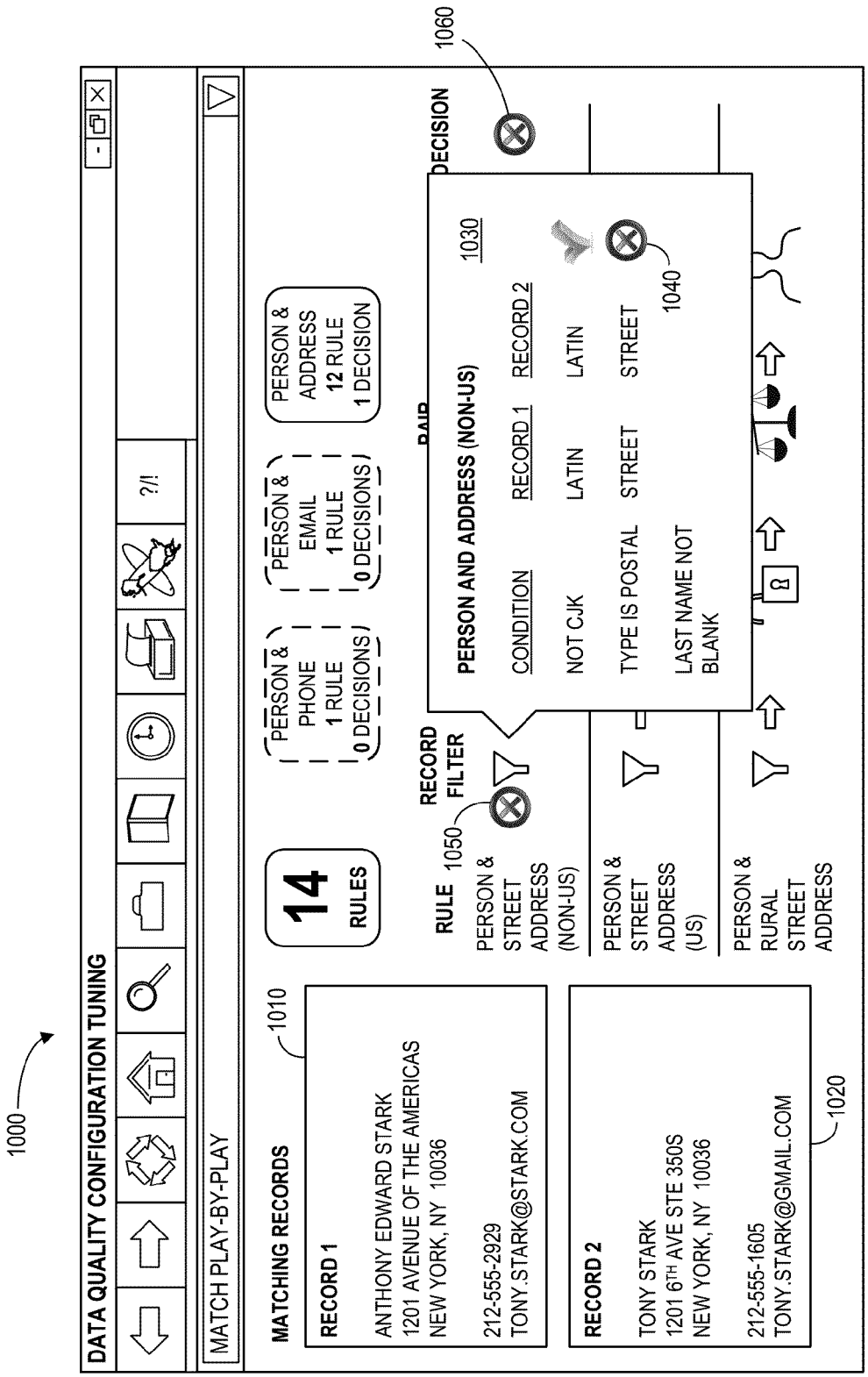

FIG. 9 illustrates in detail the application of the record filter of the "Person & Street Address (Non-US)" rule on a play-by-play display 900 for the two records 910, 920. Note that used herein, the phrase "record filter" may refer to a record based filter that includes a list of one or more requirements that must be true for an individual record to qualify for the match rule. Note that the step of evaluating record filters may be performed before any comparisons are made. As shown in FIG. 9, a pop-up window 930 indicates that a "Not China, Japan, Korea ("CJK")" condition is in process 940. FIG. 10 illustrates a play-by-play display 1000 for the two records 1010, 1020 with a pop-up window 1030 indicating that the result of that condition is success (e.g., because the address was "Latin" for both records). The pop-up window 1030 further indicates that a "Type is Postal" condition resulted in a failure 1040 (because the type was "street") and, as a result, the record filter condition is indicated as failing 1050 and the overall decision for the "Person & Street Address (Non_US)" for the two records 1010, 1020 is failure 1060.

Figure 11:
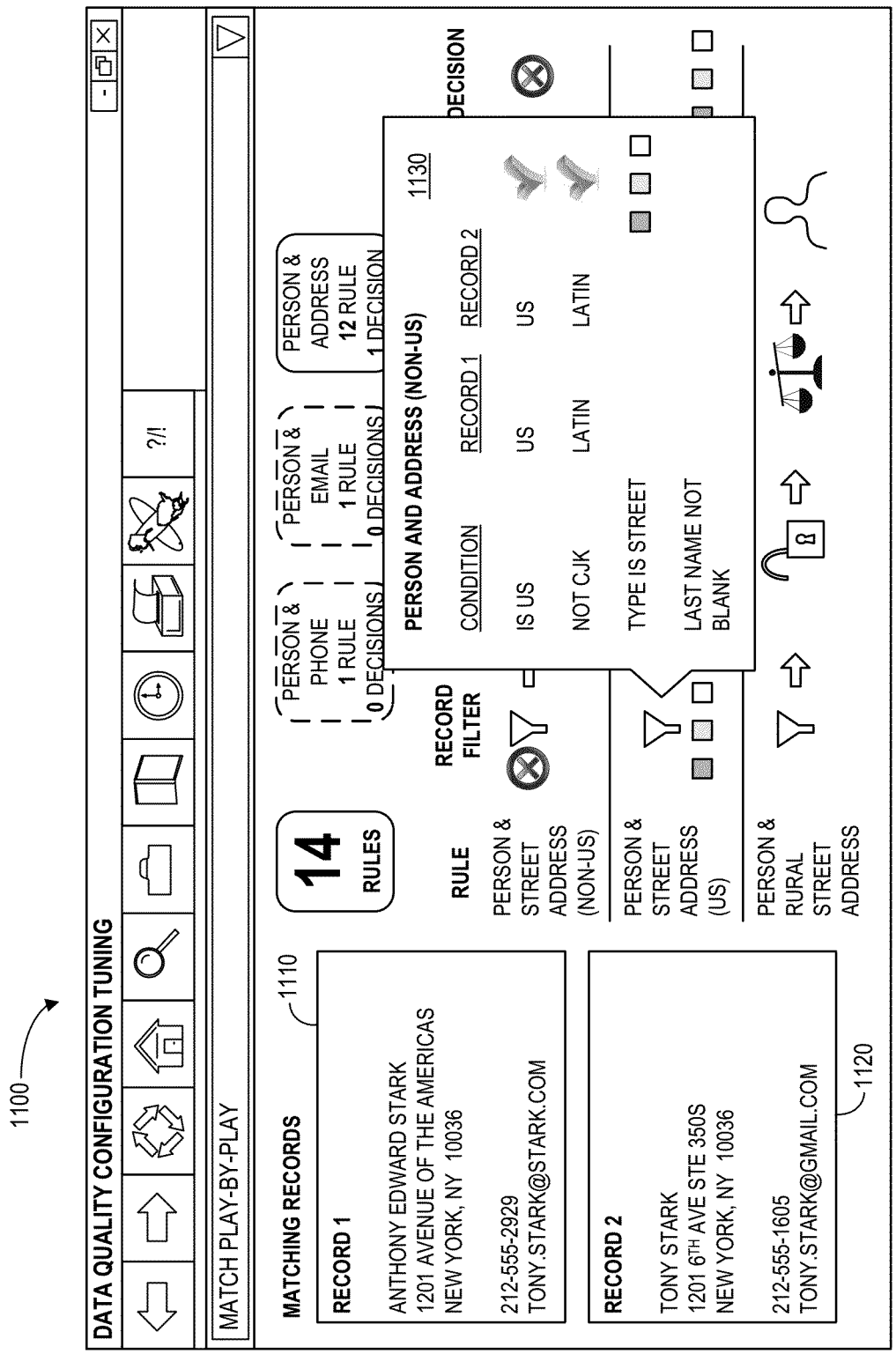
Figure 12:
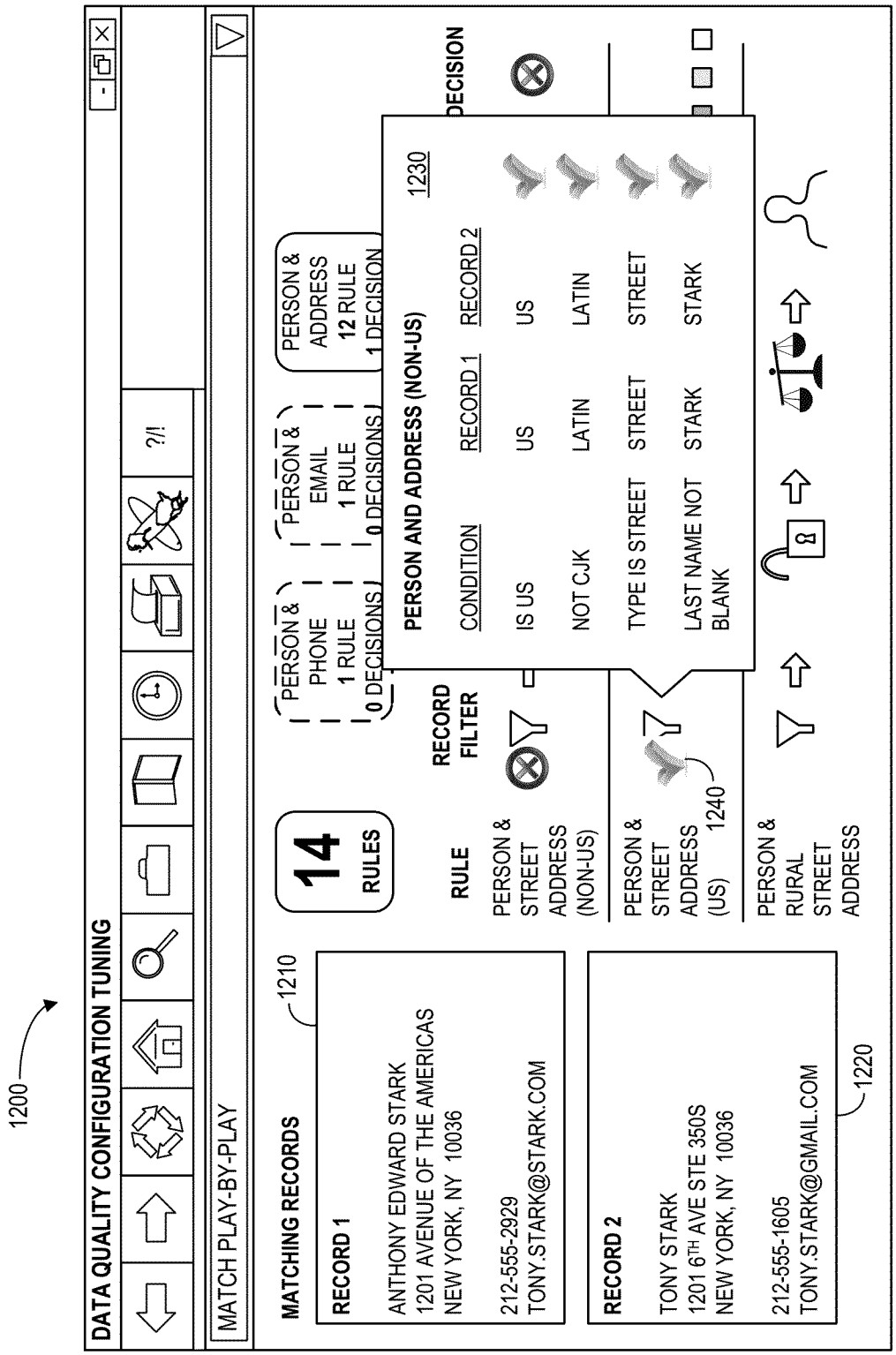

After it is determined that the overall decision for the "Person & Street Address (Non_US)" for the two records 1010, 1020 is failure 1060, the next match play-by-play display 1100 may be provided for the next rule in the set as illustrated by FIG. 11. In particular, a "Person & Street Address" rule is being evaluated for the two records 1110, 1120 as shown by the pop-up window 1130 for the record filter. The pop-up window 1130 indicates that the first two of four conditions have succeeded and the third condition is in process. FIG. 12 illustrates a match-by-match display 1200 for the two records 1210, 1220 with a pop-up window 1239 indicating that all four conditions of the record filter have succeeded, and, as a result, it is graphically indicated that the two records 1210, 1220 have passed the recorded filter via a check mark 1240.

Figure 13:
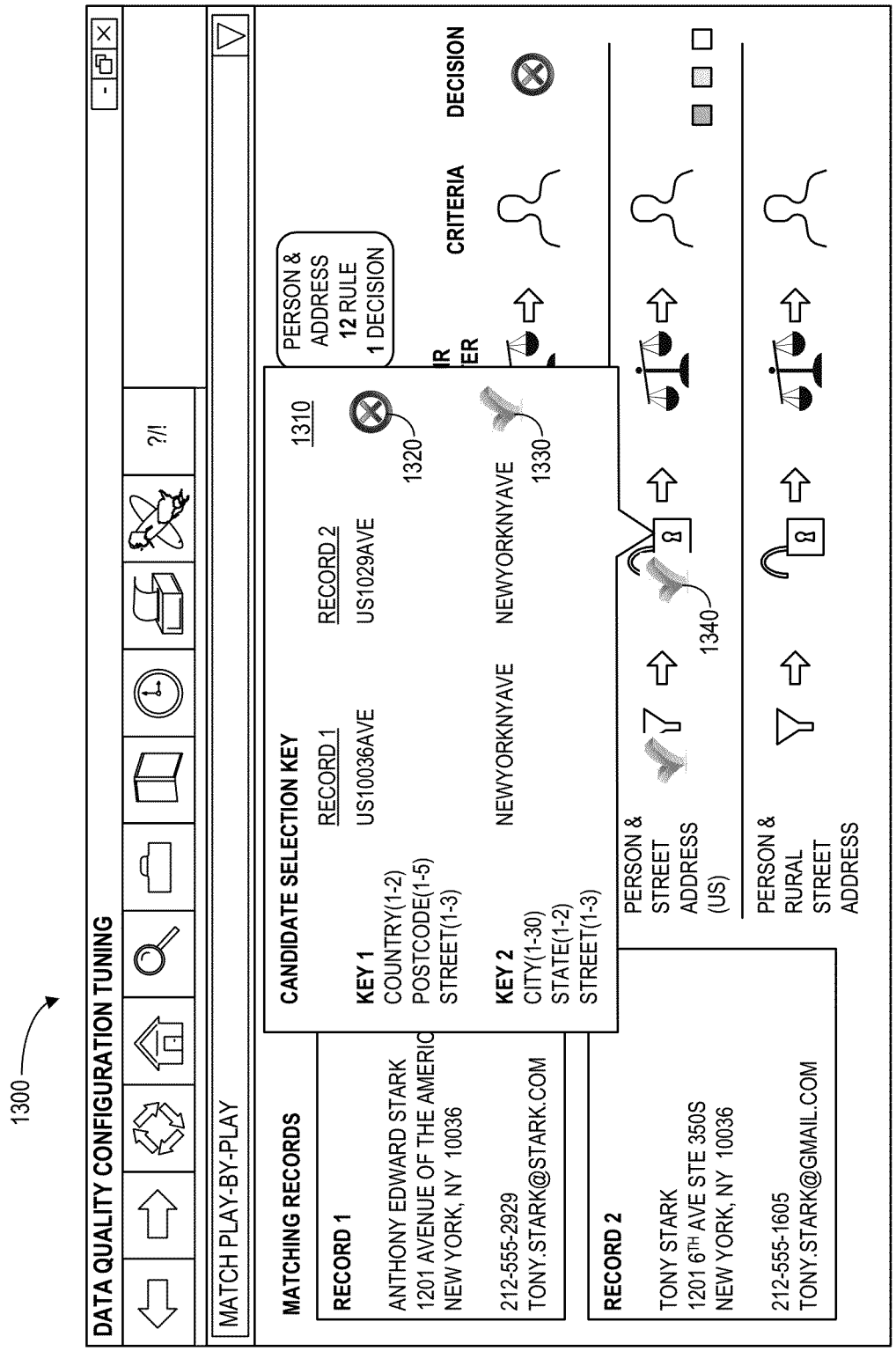

Since the two records 1210, 1220 passed the record filter stage for the "Person & Street Address (US)" rule, the match process next evaluates one or more candidate selection keys as illustrated by the display 1300 of FIG. 13. As used herein, the phrase "candidate selection key" may refer to a record based concatenation of portions of match data components. Records that have the same candidate selection key may grouped together as candidate matches and only records in the same candidate group may be compared to each other. This prevents the system from needing to compare every record with every other record, resulting in better performance. Note, however, that this approach may result in true matches being missed as matches because the two records do not have the same value for a candidate selection key.

A pop-up window 1310 indicates that a first candidate selection key comprises a sting formed of 2 country characters, 5 postcode characters, and 3 street characters. Moreover, it is graphically indicated that the first candidate selection keys do not match 1320 for the two records being evaluated (because "US10036AVE" does not equal "US1029AVE"). The second candidate selection key comprises up to 30 characters of a city name, 2 state characters, and 3 street characters. As illustrated in FIG. 13, the pop-up window 1310 graphically indicates that the keys for the two records being evaluated do match 1330 (because both equal "NEWYORKNYAVE"). As a result, the display 1300 indicates that the overall candidate selection key stage has succeeded 1340.

Figure 14:
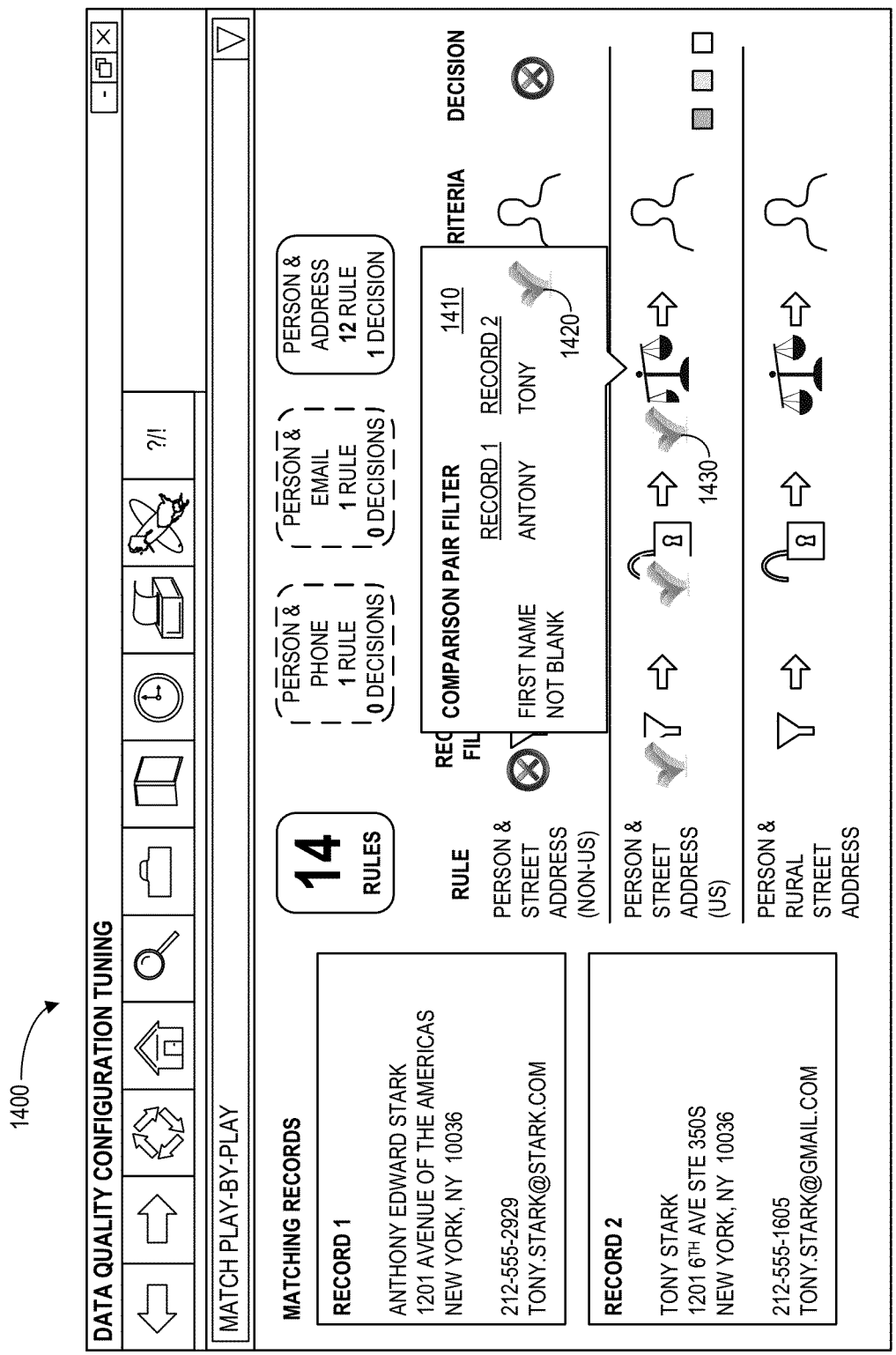

Since the two records passed the candidate selection key stage for the "Person & Street Address (US)" rule, the match process next evaluates one or more comparison pair filter conditions as illustrated by the display 1400 of FIG. 14. A pop-up window 1410 displays the evaluation of a single "First Name Not Blank" condition. In particular, it is graphically indicated that both records being evaluated pass the condition 1410 (because neither first name is blank), and the display indicates that the overall comparison pair filter condition stage has succeeded 1430. If the condition had not succeeded, the match process would have moved on to the next rule ("Person & Street Rural Address").

Figure 15:
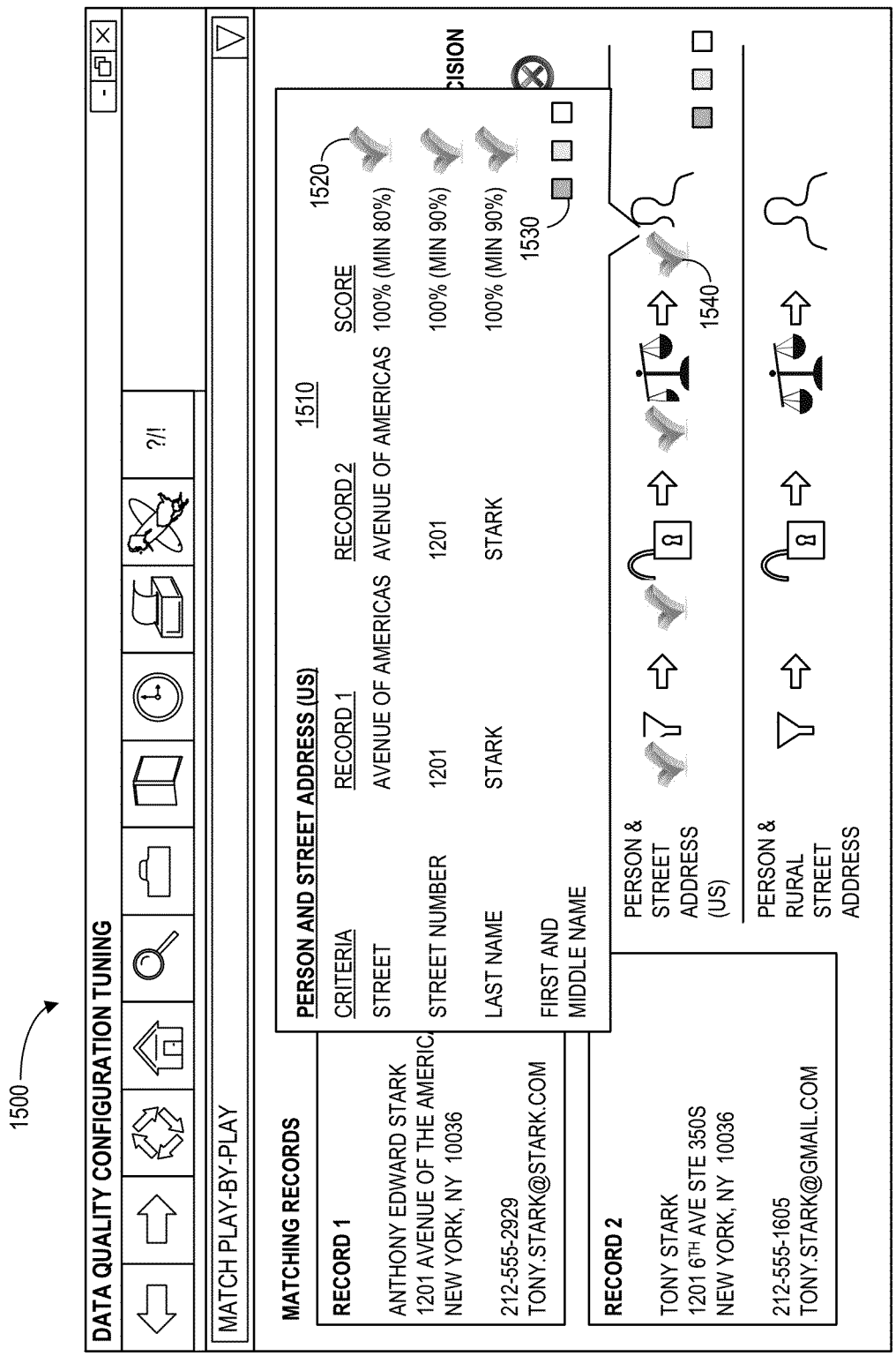

The match process next checks a number of criteria to compare the two records being evaluated as illustrated by the display 1500 of FIG. 15. Although four criteria are used in FIG. 15 as an example, note that any number of criteria (and sub-criteria) might be evaluated at this stage. A pop-up window 1510 graphically indicates that the first three criteria have been met 1520 ("Street," Street Number," and "Last Name") and that the evaluation of the fourth criteria is in process 1530 ("First and Middle Name"). Note that each criteria might be evaluated on a pass/fail basis or may be associated with a score and a minimum passing threshold. If the match process determines that the fourth criteria is met, the display 1500 would indicate that the overall criteria stage succeeded 1540.

Figure 16:
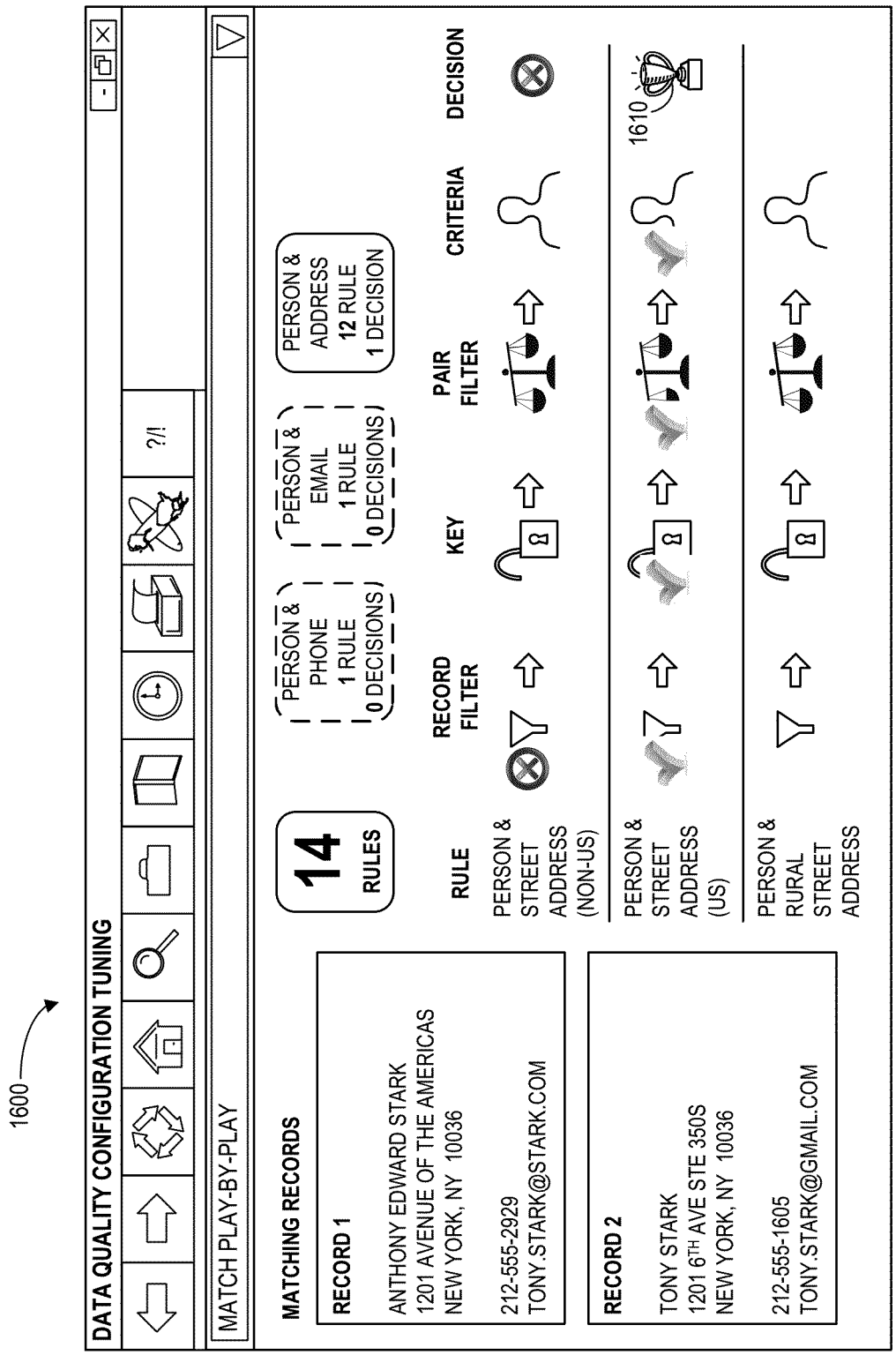

As illustrated by the display 1600 of FIG. 16, the two records being evaluated have passed all four stages of the "Person & Street Address (US)" rule. As a result, the display 1600 graphically indicates that a positive match decision 1610 has been determined for those two records. Because each step of the evaluation process was graphically displayed to the user in a step-by-step or play-by-play fashion, he or she will be better able to understand how the match decision was made (and improve the configuration if appropriate).

With the match play-by-play described herein, a user's workflow may be significantly improved. The user may quickly visualize what the match process is doing and see the details of each step without needing to look at match output fields. The user may also see the match key data used in each step. The user may see how to change something they don't like and which changes will have no effect (or which changes will have the most effect) to the data quality matching process.

Figure 17:
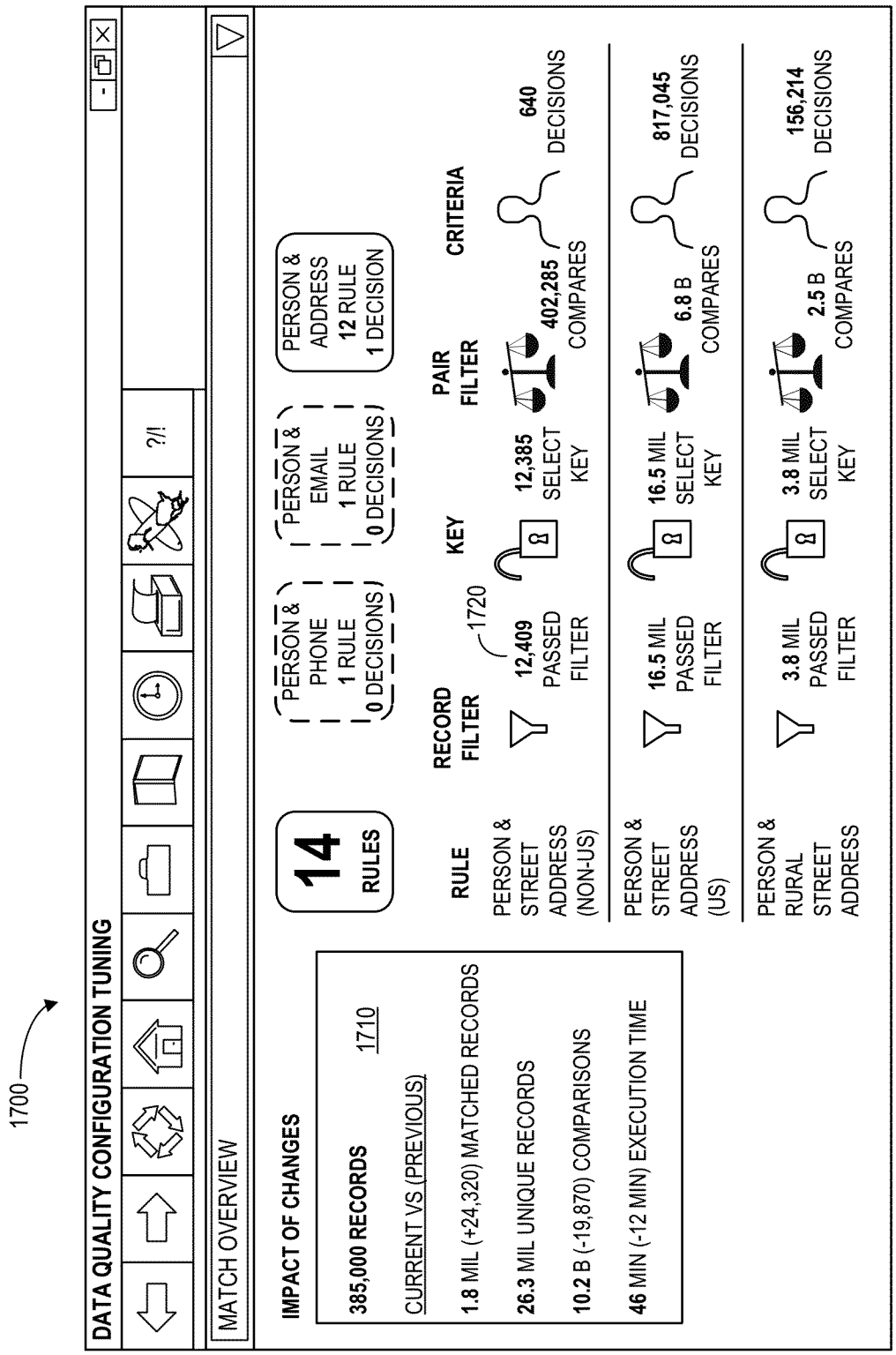
FIG. 17 illustrates a match overview display that may be provided according to some embodiments.

FIG. 17 illustrates a match overview display 1700 that may be provided according to some embodiments. The match overview display 1700 may provide information about a batch of records that have been processed via a match configuration. In particular, the display 1700 may include an impact of changes area 1710 displaying how many records were processed. The impact of changes area 1710 may also provide a comparison between the current configuration and a previous version of the configuration, including, for example, how many records match, how many unique records were determined, a number of comparisons that were performed by the process, how long it took to execute the match process, etc. The display 1700 may further indicate 1720 how many records were associated with each stage of each rule that applied by the configuration (e.g., to help a user detect potential trouble spots that may investigated for further improvement).

Figure 18:
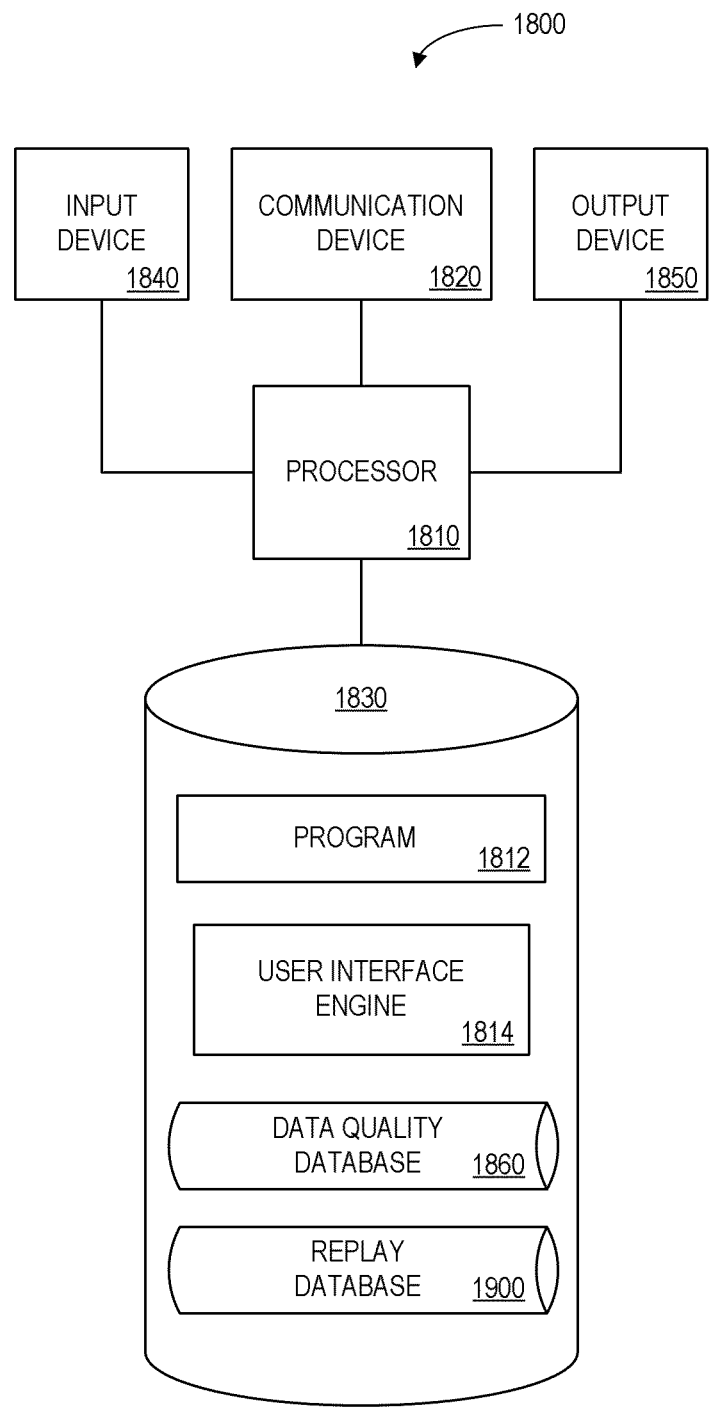
FIG. 18 is a block diagram of a data quality platform that might be provided according to some embodiments

The user interfaces described herein may be associated with any number of different hardware configurations. FIG. 18 is a block diagram overview of a data quality platform 1800 according to some embodiments. The data quality platform 1800 may be, for example, associated with any of the devices described herein. The data quality platform 1800 comprises a processor 1810, such as one or more commercially available Central Processing Units (CPUs) in the form of one-chip microprocessors, coupled to a communication device 1820 configured to communicate via a communication network (not shown in FIG. 18). The communication device 1820 may be used to communicate, for example, with one or more remote data sources, master databases, and/or data stewards. The data quality platform 1800 further includes an input device 1840 (e.g., a mouse and/or keyboard to enter configuration rule changes and replay requests) and an output device 1850 (e.g., a computer monitor to display a user interface element and/or matching process play-by-play displays).

The processor 1810 communicates with a storage device 1830. The storage device 1830 may comprise any appropriate information storage device, including combinations of magnetic storage devices (e.g., a hard disk drive), optical storage devices, and/or semiconductor memory devices. The storage device 1830 stores a program 1812 and/or a user interface engine application 1814 for controlling the processor 1810. The processor 1810 performs instructions of the programs 1812, 1814, and thereby operates in accordance with any of the embodiments described herein. For example, the processor 1810 may receive a plurality of records, and a data quality process may be performed by the processor 1810 to match at least some records with each other. A replay request associated with at least two of the received records may be received by the processor 1810, and information about the at least two records and a first decision in the matching process may be graphically displayed via a user interface. A result of the first decision in the matching process may then be graphically displayed to the user by the processor 1810. Similarly, information about the at least two records and a second decision in the matching process, subsequent to the first decision, may be graphically displayed in the user interface. A result of the second decision in the matching process may then be graphically displayed by the processor 1810.

The programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

As used herein, information may be "received" by or "transmitted" to, for example: (i) the data quality platform 1800 from another device; or (ii) a software application or module within the data quality platform 1800 from another software application, module, or any other source.

In some embodiments (such as shown in FIG. 18), the storage device 1830 stores a data quality database 1860 and a replay database 1900 (described with respect to FIG. 19). One example of a replay database 1900 that may be used in connection with the data quality platform 1800 will now be described in detail with respect to FIG. 19. Note that the databases described herein are examples, and additional and/or different information may be stored therein. Moreover, various databases might be split or combined in accordance with any of the embodiments described herein.

Referring to FIG. 19, a table is shown that represents the replay database 1900 that may be stored at the data quality platform 1800 according to some embodiments. The table may include, for example, entries identifying records that have been matched together in a group (and thus be selectable for a match replay request on a display such as the one described with respect to FIG. 6). The table may also define fields 1902, 1904, 1906, 1908 for each of the entries. The fields 1902, 1904, 1906, 1908 may, according to some embodiments, specify: a group identifier 1902, a record 1904, a country 1906, and a street 1908. The information in the replay database 1900 may be automatically created and updated, for example, when a match configuration is executed by a data quality application.

The group identifier 1902 may be, for example, an alphanumeric code associated with a particular set of records identifiers 1904 associated with records that have been matched by a matching process. The country 1906, street 1908, etc. may be fields associated with those record identifiers 1904. In the example, of FIG. 19, record identifiers "R_76393" and "R_58236" have been matched in group identifier "G_102" by a data quality matching process. Those records might then be selected by a data steward who may submit a replay request to receive a play-by-play graphical explanation of why those two particular records were matched.

Thus, a data steward may use a graphical interface to understand and/or tune configuration rules providing an improved workflow between the data steward and a data architect. Embodiments may let users look at results to understand what happened in the matching process. Moreover, users may figure out what to change to improve things or fix problems. Embodiments described herein may enable easier interpretation of results and suggestions of what changes to make to the configuration to improve the matching process. In particular, embodiments may visualize why records are matching (or why records are not matching), illustrate the impact of any configuration change, and display what match rules are being used and which match rules are having the most effect. Moreover, embodiments may graphically provide the impact and usage of record filters, candidate keys, comparison pair filters, and match criteria to help a data steward optimize configuration performance.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 20:
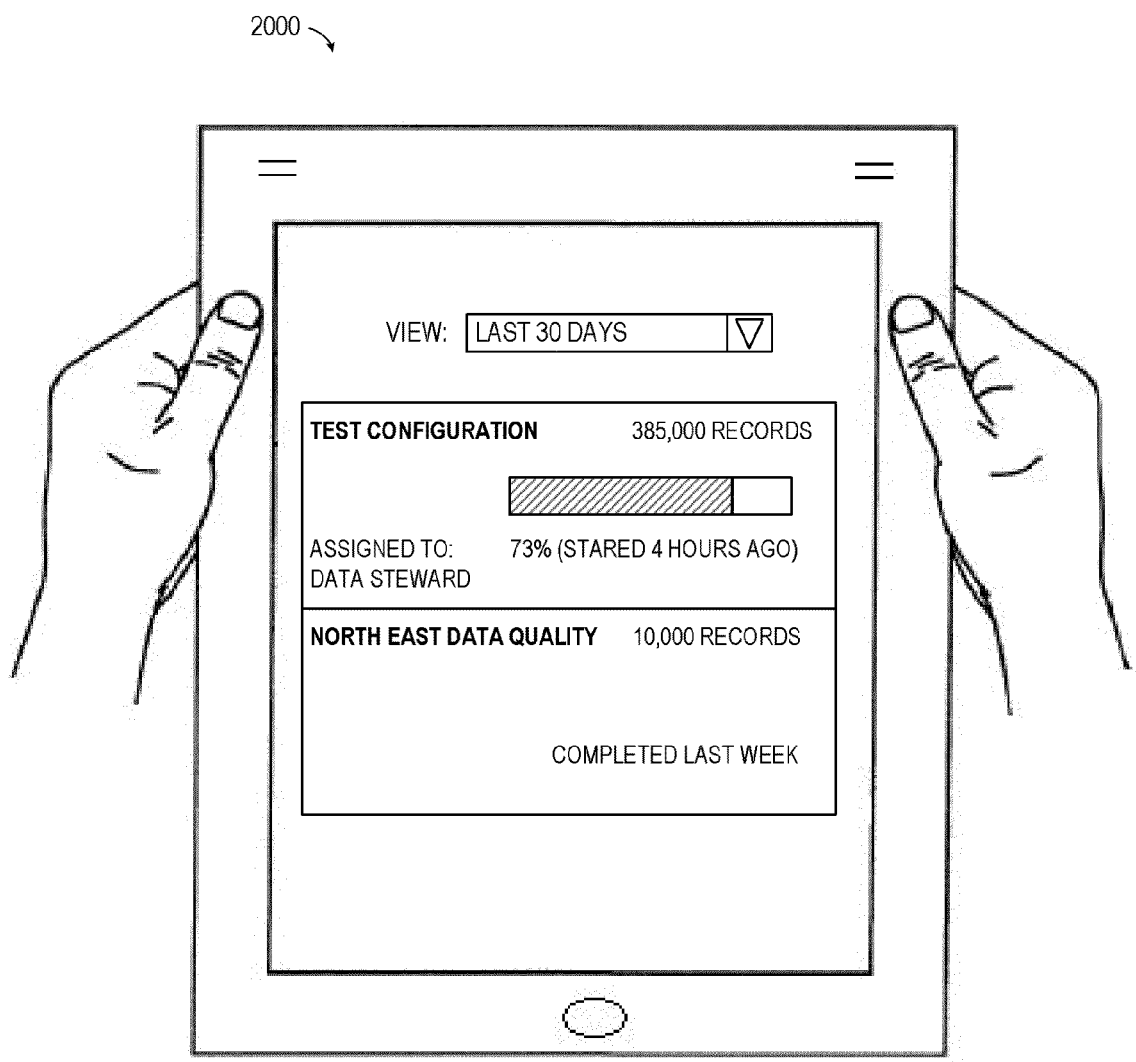
FIG. 20 illustrates a mobile device providing data quality process information in accordance with some embodiments.

Although embodiments have been described with respect to particular types of data, note that embodiments may be associated with other types of information. For example, sales orders, financial information, and health data records may be processed in accordance with any of the embodiments described herein. Similarly, while some embodiments have been described with respect to web-type browser displays, FIG. 20 illustrates a data quality process user interface being displayed on a handheld device 2000, such as a laptop, a tablet computer, or a smartphone, including information about a matching configuration.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, comprising:
receiving a plurality of records, each of the plurality of records comprising a plurality of fields;
executing, by a computer processor of a data quality platform, a matching process to match at least some of the records with each other based the plurality of fields; and
receiving from a user a replay request associated with at least two of the received records that were included in the matching process to initiate a play-by-play presentation of the matching process, the play-by-play presentation comprising: (i) graphically displaying, via a user interface, information about the at least two records and a first decision in the matching process, (ii) graphically displaying to the user a result of the first decision in the matching process, (iii) graphically displaying, via the user interface, information about the at least two records and a second decision in the matching process, subsequent to the first decision, and (iv) graphically displaying to the user a result of the second decision in the matching process.

2. The method of claim 1, further comprising:
receiving, from the user, an adjustment to the matching process.

3. The method of claim 2, further comprising:
executing, by the computer processor of the data quality platform, the adjusted matching process; and
displaying a result of the adjusted matching process to the user.

4. The method of claim 3, further comprising:
displaying a comparison between the matching process and the adjusted matching process to the user.

5. The method of claim 1, wherein the user interface includes a graphical representation associated with at least one of: (i) why records are matching, and (ii) why records are not matching.

6. The method of claim 1, wherein the user interface includes a graphical representation associated with at least one of: (i) which match rules are currently being used, and (ii) which match rules have the most effect.

7. The method of claim 1, wherein the play-by-play presentation further comprises displaying a failure associated with the second decision in the matching process.

8. A non-transitory, computer-readable medium storing program code executable by a computer to:
receive a plurality of records, each of the plurality of records comprising a plurality of fields;
execute a matching process to match at least some of the records with each other based the plurality of fields;
receive from a user a replay request associated with at least two of the received records that were included in the matching process to initiate a play-by-play presentation of the matching process, the play-by-play presentation comprising: (i) graphically displaying, via a user interface, information about the at least two records and a first decision in the matching process (ii) graphically displaying to the user a result of the first decision in the matching process (iii) graphically displaying, via the user interface, information about the at least two records and a second decision in the matching process, subsequent to the first decision and (iv) graphically displaying to the user a result of the second decision in the matching process.

9. The medium of claim 8, further storing program code executable by the computer to:
receive, from the user, an adjustment to the matching process.

10. The medium of claim 9, further storing program code executable by the computer to:
execute the adjusted matching process; and
display a result of the adjusted matching process to the user.

11. The medium of claim 10, further storing program code executable by the computer to:
display a comparison between the matching process and the adjusted matching process to the user.

12. The medium of claim 8, wherein the user interface includes a graphical representation associated with at least one of: (i) why records are matching, and (ii) why records are not matching.

13. The medium of claim 8, wherein the user interface includes a graphical representation associated with at least one of: (i) which match rules are currently being used, and (ii) which match rules have the most effect.

14. The medium of claim 8, wherein the user interface includes a graphical representation associated with at least one of: (i) record filters, (ii) candidate keys, (iii) comparison pair filters, and (iv) match criteria.

15. A system, comprising:
at least one data source to provide a plurality of records, each of the plurality of records comprising a plurality of fields;
a matched record data store;
a data quality platform, comprising a computer processor, coupled to the input data source and the matched record data store, to (i) receive the records from the input data store, (ii) executing a matching process based the plurality of fields via the computer processor, and (iii) store matched records into the matched record data store; and
a User Interface ("UI") platform, wherein the UI platform is to:
receive from a user a replay request associated with at least two of the received records that were included in the matching process to initiate a play-by-play presentation of the matching process, the play-by-play presentation comprising: (i) graphically displaying information about the at least two records and a first decision in the matching process at a computer output device (ii) graphically displaying a result of the first decision in the matching process at the computer output device (iii) graphically displaying information about the at least two records and a second decision in the matching process, subsequent to the first decision at the computer output device, and (iv) graphically displaying to the user a result of the second decision in the matching process at the computer output device.

16. The system of claim 15, wherein the UI platform is further to:
receive, from the user, an adjustment to the matching process.

17. The system of claim 16, wherein the UI platform is further to:
execute the adjusted matching process, and
display a result of the adjusted matching process to the user.

18. The system of claim 17, wherein the UI platform is further to:
display a comparison between the matching process and the adjusted matching process to the user.

19. The system of claim 15, wherein the UI includes a graphical representation associated with at least one of: (i) why records are matching, and (ii) why records are not matching.

20. The system of claim 15, wherein the UI includes a graphical representation associated with at least one of: (i) which match rules are currently being used, and (ii) which match rules have the most effect.

21. The system of claim 15, wherein the UI includes a graphical representation associated with at least one of: (i) record filters, (ii) candidate keys, (iii) comparison pair filters, and (iv) match criteria.

* * * * *